United States Patent
Worden et al.

[15] 3,654,809
[45] Apr. 11, 1972

[54] TEMPERATURE MEASUREMENT TECHNIQUE AND APPARATUS

[72] Inventors: John R. Worden, Tacoma; Albert W. Kratzke, Bellevue, both of Wash.

[73] Assignee: The Boeing Company, Seattle, Wash.

[22] Filed: May 5, 1969

[21] Appl. No.: 821,602

[52] U.S. Cl. ............................................73/355 R, 356/43
[51] Int. Cl. ..........................................G01j 5/10, G01j 5/60
[58] Field of Search....................73/355, 355 EM; 356/45, 43

[56] References Cited

UNITED STATES PATENTS

| 2,658,390 | 11/1953 | Machler | 73/355 |
| 2,695,364 | 11/1954 | Wolfe | 73/355 X |
| 2,978,589 | 4/1961 | Howell | 73/355 UX |
| 3,454,769 | 7/1969 | Dynes | 73/355 |

OTHER PUBLICATIONS

Treiman, L. H. A Precision Photon Counting Pyrometer, in Temperature: Its Measurement and Control in Science and Industry, Vol. 3, Part 1, pp. 523– 527. QC 271 A6

Primary Examiner—Louis R. Prince
Assistant Examiner—Frederick Shoon
Attorney—Glenn Orlob, Kenneth M. MacIntosh and Kenneth W. Thomas

[57] ABSTRACT

Method and apparatus for remotely measuring absolute color temperature wherein radiation emitted from a source is collected, divided into two parts at least one of which is subjected to spatial spectral filtering, and directed upon a time shared detector to generate two sets of electrical signals which, when ratioed, provide an output signal proportional to a selected power of the absolute color temperature of the source. In another embodiment, the source radiation is directed upon both an energy and a quantum detector, and the respective detector output signals ratioed to obtain a signal directly proportional to the absolute color temperature of the source.

6 Claims, 4 Drawing Figures

INVENTORS:
ALBERT W. KRATZKE
JOHN R. WORDEN
BY
Kenneth M. MacIntosh
ATTORNEY

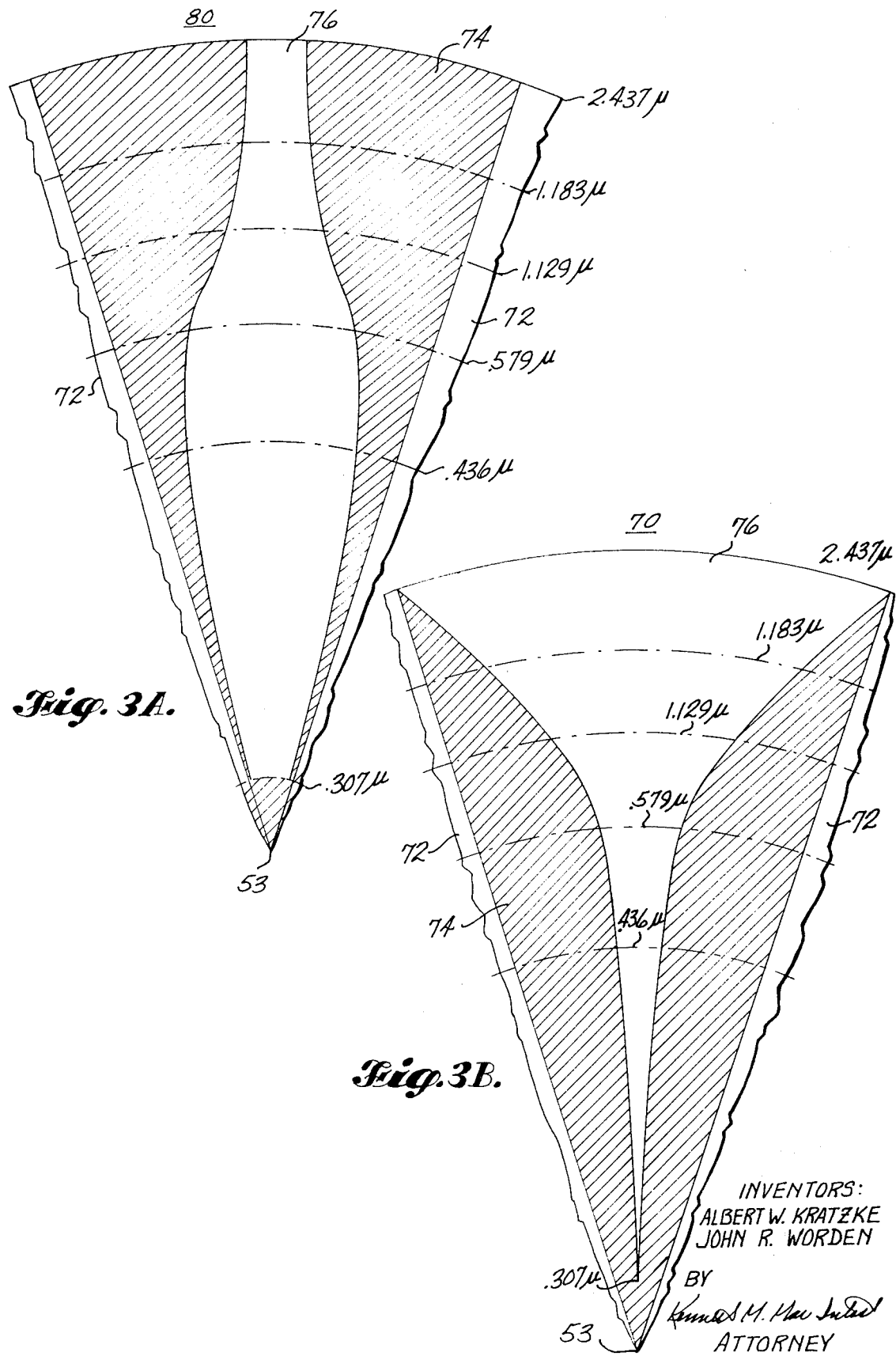

TEMPERATURE MEASUREMENT TECHNIQUE AND APPARATUS

BACKGROUND OF THE INVENTION:

This invention relates generally to methods and apparatus for measuring the absolute color temperature of a thermally radiating source from a remote position.

The prior art has seen the development of numerous devices and methods for measuring the temperature of various sources such as machinery, electronic components, heated or molten metals, fluids, plasmas, stars, and other space objects, etc. Many such prior art devices, such as thermometers and thermocouples, require that a conductive thermal contact be established between the measuring device and the source whose temperature is to be determined; and such requirements impose severe limitations upon the use of these devices, rendering them inadequate where the source is distant from the observer and conductive thermal contact cannot be established. Even where such thermal contact is possible, the thermal equilibrium of the source is often influenced by the presence of the measuring device. This limitation is particularly severe where the source is of minute dimensions such as microminiaturized electronic components. Most of these limitations have been avoided in the prior art by the development of radiometric devices in which remote measurement is accomplished without the necessity of establishment of conductive thermal contact with the source. Generally, in radiometric techniques of temperature measurement, thermal radiation from the source is collected and directed to a thermister, photovoltaic detector, photoconductive detector or other thermally sensitive elements which respond in accordance with the radiation directed upon it. However, the response of the detector cannot be correlated with the temperature of the source in these prior art devices unless other factors are known. The most important of these other factors is the emissivity of the source which has typically been found to vary with wavelength, temperature, and the surface condition of the source. In the case of a source in the form of a plasma, exhaust plume, or fluid stream with varying degrees of opacity, the determination of emissivity, and hence temperature, often poses insurmountable obstacles to accurate temperature measurement.

By filtering the collected thermal radiation into two spectral bands, the prior art has developed the two-color radiometer by which the slope of the source's energy spectral distribution curve is reconstructed and, assuming gray body conditions, the absolute color temperature can be inferred. While these techniques have proven useful in deriving relative temperatures, they cannot provide accurate absolute color temperature measurements when the spectral emissivity varies from the assumed gray body conditions. Improved accuracy can be obtained by expanding the two-color radiometric technique to multi-color measurements in an attempt to more accurately reconstruct the actual spectral energy distribution curve of the source. Such techniques, however, require lengthy computation in order to correct the spectral emissivity variations which seriously limits the application of the technique when real time absolute color temperature measurements are sought.

SUMMARY OF THE INVENTION:

It is therefore an object of this invention to provide a method of measuring the absolute color temperature of a source without requiring a knowledge of the emissivity of the source.

It is another object of this invention to provide a method of performing a remote, real time measurement of the absolute color temperature of the source irrespective of the spectral emissivity variation of the source.

It is yet another object of this invention to provide an electrical signal proportional to the absolute color temperature of a source without resorting to a multiple spectral band filtration and extensive computation.

These and other objects of this invention are realized by collecting a solid angle of a substantial portion of the total spectral range of the radiation emitted by a source and processing the collected radiation to generate a first electrical signal proportional to a first selected power, m, of the wavelength, and a second electrical signal proportional to a second selected power, n, of the wavelength of the radiation. When these two electrical signals are ratioed, the first to the second, an electrical output signal is obtained which is proportional to the absolute color temperature of the source raised to the power of $(m - n)$ irrespective of the emissivity characteristics of the source.

The first and second electrical signals may be generated by directing alternate pulses of the collected radiation that have been spectrally filtered according to different selected powers of wavelength to a single time shared radiation detector, followed by separately time integrating the alternate detector output pulses. Alternatively, the first and second electrical signals may be obtained by directing a first portion of the collected radiation to a radiation detector having energy response characteristics, and a second portion of the collected radiation to a radiation detector having photon counting response characteristics. In either event, the ratio of the first electrical signal to the second will yield an output signal that is a function of the absolute color temperature of the source.

BRIEF DESCRIPTION OF THE DRAWINGS:

FIG. 3A is a detail of a contoured segment of the reticle wheel that may be used in the embodiment of FIG. 2.

FIG. 3B is a detail of another contoured segment of the reticle wheel that may be used in the embodiment of FIG. 2.

Figure 1:
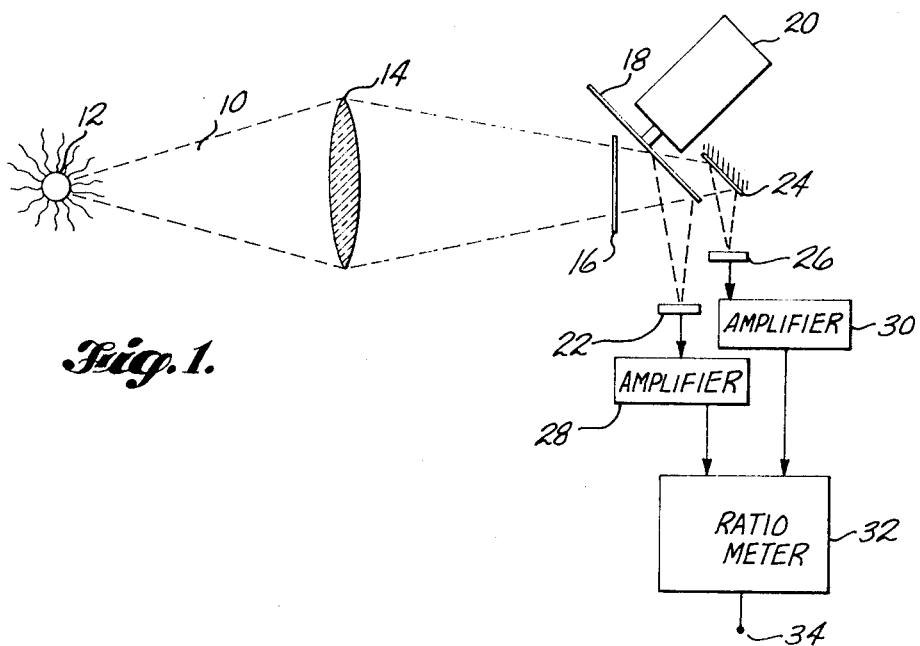
FIG. 1 is a schematic representation illustrating the optical and mechanical orientation of the basic elements of one embodiment of the invention in which two detectors are used.

DESCRIPTION OF THE PREFERRED EMBODIMENTS:

This invention is directed to a technique for ascertaining the absolute color temperature of a thermally radiating source. Absolute color temperature as used herein is defined as the temperature of a gray body, i.e., an object having an emissivity that is constant as a function of wavelength, whose spectral energy distribution curve best fits the spectral energy distribution curve of the source being measured.

Or, the absolute color temperature can be stated in terms of quantum relationships as the temperature of a gray body whose spectral photon flux distribution best fits the spectral photon flux distribution of the source. The temperatures obtained by separately fitting energy and photon gray body distributions will be identical for gray body sources, but will yield slight differences for non-gray body sources. This definition of temperature can be applied to all sources of thermal radiation which include all substances at finite temperatures whether they be in the form of solids, liquids, or gases. In addition, an absolute color temperature can be assigned to sources radiating monochromatically and while such a designation does not have wide general application, it can be used successfully for comparison and calibration purposes.

In the practice of one embodiment of this invention the best fit gray body curve is obtained by making essentially two measurements of the source, the first being the total energy emitted by the source over a wide spectral range and the second being the total photons emitted over the same spectral range.

Analytically, the total energy, $W$, emitted by a black body source is obtained by integrating the spectral radiant emittance, $W$, as given by the energy form of the Planck radiation equation over a wavelength of from zero to infinity:

$$W_\lambda = 2\pi hc^2 \lambda^{-5}(e^{\frac{hc}{\lambda kT}}-1)^{-1} \qquad (1)$$

where: $h$ = Planck's constant, $c$ = velocity of light, $\lambda$ = wavelength, $k$ = Boltzmann's constant and $T$ = absolute temperature. Integrating equation (1) to obtain total energy of the black body, $W$:

$$W = \int_0^\infty W_\lambda d\lambda = 2\pi hc^2 \int_0^\infty \lambda^{-5}(e^{\frac{hc}{\lambda kT}}-1)^{-1} d\lambda = \sigma T^4 \quad (2)$$

where $\sigma$ is the Stephan-Boltzmann constant.

Similarly, the number of photons, $Q$, emitted by a black body source is obtained by integrating the radiant photon emittance, $Q\lambda$, as given by the quantum form of the Planck radiation equation over a wavelength range of from zero to infinity:

$$Q_\lambda = 2\pi c \lambda^{-4}(e^{\frac{hc}{\lambda kT}}-1)^{-1} \quad (3)$$

integrating to obtain total photons, $Q$:

$$Q = \int_0^\infty Q_\lambda d\lambda = 2\pi c \int_0^\infty \lambda^{-4}(e^{\frac{hc}{\lambda kT}}-1)^{-1} d\lambda = qT^3 \quad (4)$$

where $q$ is a constant equal to $1.52 \times 10^{11}$ photons sec$^{-1}$ cm.$^{-2}$ °K$^{-3}$.

Taking the ratio of equation (2) to equation (4) will yield an expression which is directly proportional to the absolute color temperature of the source:

$$\frac{W}{Q} = \frac{\sigma T^4}{qT^3} = \frac{\sigma}{q} T \quad (5)$$

If the thermal radiation from a source is directed to a detector having energy response characteristics, an output signal will be obtained proportional to the relationship given by equation (2). Detectors of this type include thermisters, bolometers, and radiation thermocouples of various configurations. Upon being irradiated, detectors having photon counting characteristics will exhibit a response proportional to that shown by equation (4). Detectors of this type include photovoltaic, photoconductive, and other quantum detectors. The ratio of the electrical output signals from the two types of detectors, each viewing the source with the same spectral bandpass, will yield a final electrical output signal that is directly proportional to the absolute color temperature of the source as is shown by equation (5).

Variations of the response of energy and quantum detectors from that given by equations (2) and (4) occur when the bandpass of the respective detectors and the associated optical systems are not sufficiently broad to permit linear integration of the radiation over the wavelength range of from zero to infinity as required by the derivation of the equations. This distortion may be minimized by selecting detectors having linear response over a bandpass sufficiently broad to encompass a substantial portion of the thermal radiation emitted by the source. For this reason, absolute color temperature values should be defined with respect to the spectral bandpass of the measuring system, and the bandpass should be as broad as practical.

The derivation of equations (2) and (4) were given for the case of black body radiation. While the relationship of these equations will also hold, differing only by a constant factor, for the case of gray body radiation, equations (2) and (4) are not useful by themselves for describing the radiation from non-gray body sources, i.e., sources whose emissivity varies as a function of wavelength, temperature, or some other factor. However, if two broad band detectors, each having uniform energy and photon counting response characteristics, respectively, view a non-gray body source, a ratio of their output signals represents the best simultaneous fit of the source spectral radiation to the two detectors' responses. The two detector responses represent two unique methods of measuring the same non-gray body radiation; and the resulting ratio and temperature value correspond to a planckian gray body curve having a peak between the energy and photon gray body peaks, and having a temperature between the energy and photon gray body temperatures. Since the difference between the corresponding energy and photon gray body temperatures is small in the first instance, an interpolated value can be defined as the absolute color temperature of the non-gray body source for the stipulated measurement conditions.

FIG. 1 illustrates apparatus that may be used to practice this invention wherein a solid angle of radiation 10 emitted by thermally radiating source 12 is collected by optics 14 and filtered by bandpass spectral filter 16. After passing through filter 16, the collected radiation is directed to a beam splitter which, in the embodiment illustrated in FIG. 1, takes the form of segmented chopper wheel 18 rotated by motor 20. Chopper wheel 18 has alternate segments that are reflective and transparent to the radiation passing through the filter 16; and as the chopper wheel 18 rotates, the collected radiation is alternately reflected from the reflective segments of chopper wheel 18 to impinge upon quantum detector 22 and transmitted through the transparent segments of chopper wheel 18 to be reflected by compensating mirror 24 to impinge upon energy detector 26. Care should be taken to ensure that the elements of the optical train including collecting optics 14, filter 16, chopper wheel 18, and compensating mirror 26 all have a relatively flat response so that the radiation impinging upon both detectors 22 and 26 is essentially the same over the entire spectral band of interest. The spectral bandpass of filter 16 should be sufficiently wide to encompass a major portion of the radiation emitted by source 12 so that when the radiation is received and integrated by detectors 22 and 26, the integration will be substantially equivalent to that demonstrated in the derivations of equations (4) and (2). Of course, the beam splitter function performed by segmented chopper wheel 18 and motor 20 may also be accomplished with other beam splitter devices known in the art such as partially reflecting mirrors or prisms. The chopper wheel configuration has the advantage that pulsed signals are produced and ac type instrumentation may be used. Mirror and prism beam splitters are essentially dc devices and, lacking a separate chopper in the system, dc instrumentation with its normally higher noise levels must then be employed.

Compensating mirror 24 is included in the path of that radiation directed to detector 26 to balance the radiation received by detectors 22 and 26 and thereby compensate for any spectral distortion created by the reflective segments of chopper wheel 18. Similarly, in certain instances, it may be necessary to include a transparent window in the path of the radiation directed to detector 22 in order to compensate for the effects of the transparent segments of chopper wheel 18.

Energy detector 26 may be selected from any of a number of detectors having essentially constant spectral energy response characteristics such as thermisters, bolometers, and others well known in the art. Energy detector 26 functions on the principle that impinging radiation is absorbed into the surface of the detector and converted into heat in the bulk of the detector material. The resulting rise in temperature of the bulk detector material alters its electrical resistivity which is measured by a change in voltage, drop in bias signal impressed across the detector, or by a change in bias current passing through the detector. As is well known in the art, quantum detector 22 functions on the principle that received protons release electrons which are detected or alter the conduction bands of the detector material thus changing its conductivity in the case of photovoltaic quantum detectors. Typical examples of quantum detectors suitable for detector 22 include lead sulphide, copper-doped germanium, and others having relatively constant photon counting characteristics irrespective of photon energy. Both the energy and quantum detectors selected for detectors 26 and 22, respectively, should have relatively similar sensitivities and be configured to have the same field-of-view.

Detectors 22 and 26 generate electrical signals that are proportional to the photon flux and the energy of the received radiation, respectively. Because these detectors generally provide lowelevel signals, it is normally desirable to provide amplification before the detector output signals are processed further. The output signals of detectors 22 and 26 are therefore set to amplifiers 28 and 30, respectively, which can be selected from equipment available in the art. After amplification, the output signals of amplifiers 28 and 30 are ratioed or divided according to the teachings of equation (5) by ratiometer 32, to obtain a ratio signal at output terminal 34 which is proportional to the absolute color temperature of the source 12.

In the embodiments of this invention, the term "ratiometer" is taken to mean any of a number of circuits or devices known in the art that are capable of ratioing, multiplying, or dividing one electrical signal with respect to another. Ratiometers that can be used at 32 to perform the ratioing of the signal from energy detector 26 to the signal to the quantum detector 22 are known to those skilled in the art and a typical commercially available unit for performing this function is the Hewlett Packard Model 416-B Ratio Meter. Conventional calibration techniques using standard black body sources are available for determining the constant of proportionality of the output signal at terminal 34 from the ratiometer 32 so that the output signal can be directly correlated with the absolute color temperature of any black body, gray body, or non-gray body source 12.

The practice of this invention is not limited to the use of detectors having different basic response characteristics such as an energy detector and a quantum detector. Since the response characteristics of these two types of detectors have a definite relationship to each other as is shown by equations (1) and (3), spectral filtering techniques can be employed to alter the apparent characteristics of one type of detector to match that of the other. In this manner, two detectors of the same type can be used with the radiation directed to one of the detectors being spectrally filtered so that the response characteristics of that detector will be equivalent to that of the opposite type. Since filters that may be used for this purpose have filter factors that are a function of wavelength, they are referred to as $\lambda$ filters. Thus if the radiation directed to an energy detector is spectrally filtered by passing it through a $\lambda$ filter, the response of the energy detector will be equivalent to that obtained by directing the same energy to a quantum detector. Conversely a $1/\lambda$ filter applied to the radiation directed to a quantum detector will change its apparent response to that of an energy detector.

Figure 2:
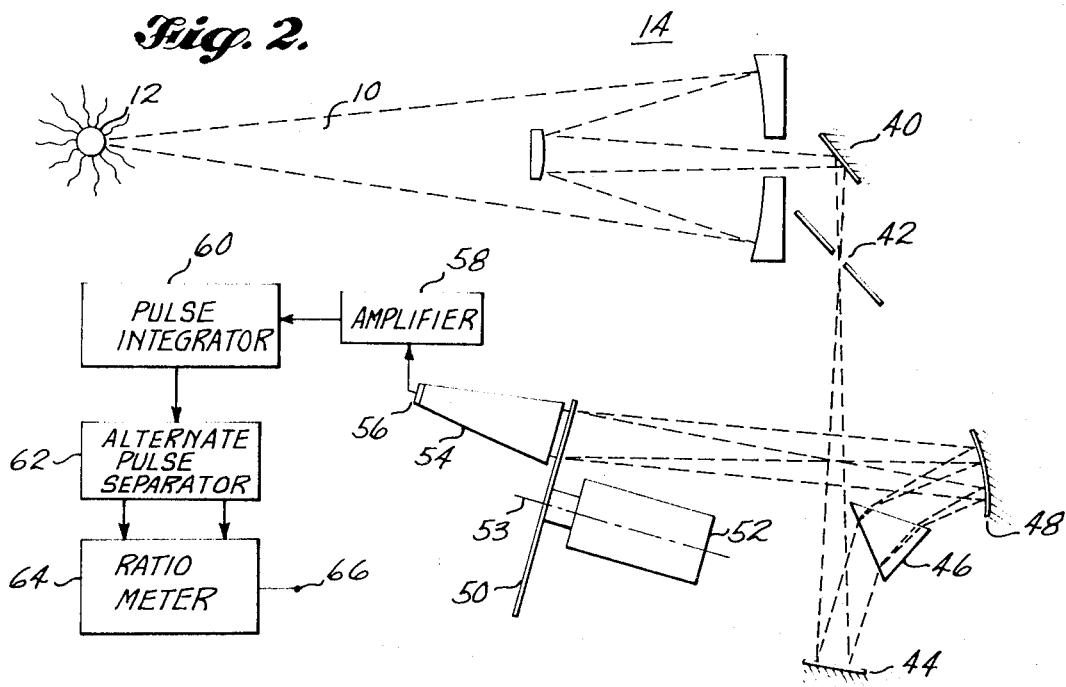
FIG. 2 is a schematic representation illustrating the optical and mechanical orientation of the basic elements of another embodiment of the invention in which a single time shared detector is used.

It can be readily understood then, that by using the concept of spectral filtering a temperature measuring technique employing only one detector of either the energy or quantum type can be implemented. FIG. 2 shows an apparatus employing a single detector used on a time sharing basis to measure the absolute color temperature of a source according to the teachings of this invention. In that figure, a solid angle of thermal radiation 10 emitted by source 12 is collected by optical system 14, reflected by mirror 40 through pinhole aperture 42 to collimating mirror 44 where it is collimated into parallel rays. Thereafter, the radiation is spectrally dispersed by prism 46 into a line spectrum which is focused by mirror 48 onto reticle wheel 50 rotated by motor 52 about axis 53. That radiation passing through reticle wheel 50 enters cone channel condenser 54 which reduces the physical size of the spectrum line so as to be more compatible with the physical dimensions of detector 56 to which the spectrum line is directed. Because of the chopping action of reticle wheel 50 driven by motor 52 the electrical output of detector 56 will be a train of pulses which are amplified at 58 and separately integrated at 60. Alternate electrical pulses are separated at 62 and ratioed by ratiometer 64 which produces an electrical output signal at terminal 66 which is proportional to the absolute color temperature of source 12.

The embodiment of FIG. 2 is designed to filter the collected radiation by a factor of either $\lambda$ or $1/\lambda$ by using the technique of spatial spectral filtering. Reticle wheel 50 has two sets of alternating segments designed to provide the required spectral filtering; the first set of segments is pie-shaped and completely transparent to the radiation impinging upon it while the second alternate set of segments has a transparent area contoured to match the filter factor desired to be imparted to the radiation. As an example, if detector 56 is selected to be one having energy response characteristics, the second set of alternate segments of reticle wheel 50 will contain transparent areas contoured as a function of wavelength. A contoured segment for this application is shown in FIG. 3B and is designed to receive the spectrum line along a radius of reticle wheel 50 with the shorter wavelengths of the spectrum line in this example falling at a radial distance closer to the rotational axis 53 of reticle wheel 50. More particularly, FIG. 3B shows a contoured segment 70 of reticle wheel 50 positioned between two completely transparent pie-shaped segments 72. Contoured segment 70 has an area 74 which is opaque to the radiation directed upon it and a contoured area 76 which is transparent to the same radiation. If reticle wheel 50 is positioned as shown in FIG. 2 and rotated at a constant angular velocity by motor 52 about axis 53, continuous spectral portions of the spectrum line image of longer wavelengths will be transmitted through reticle wheel 50 to detector 56 for durations longer than those of shorter wavelengths as contoured segment 70 sweeps through the focused spectrum line. When this spectrally filtered pulse of radiation is received by energy detector 56, the electrical output signal of energy detector 56, after being amplified at 58 and integrated with respect to time at 60, will be equivalent to the response of a quantum detector receiving the same radiation without spectral filtering. However, as the transparent, pie-shaped segment 72 of reticle wheel 50 sweeps through the radiation line spectrum, no filter factor is introduced and the output of detector 56 retains the characteristics of that obtained from an energy detector. This output signal is also amplified at 58 and integrated with respect to time at 60. Those pulses having quantum characteristics are separated from those having energy characteristics at 62 to produce two sets of electrical signals, the first of which has quantum response characteristics and the second, energy response characteristics. As in the embodiment shown in FIG. 2, these two electrical signals are ratioed by ratiometer 64 to produce a final output electrical signal at terminal 66 which is proportional to the absolute color temperature of source 12.

If detector 56 in FIG. 2 is selected to be a quantum detector, the contoured segments of reticle wheel 50 may have the configuration shown in FIG. 3A which illustrates a filter factor of $1/\lambda$. The reticle pattern of FIG. 3A is similar to that of FIG. 3B in that it shows a contoured segment 80 between two transparent segments 72 with contoured segment 80 having opaque areas 74 and a transparent area 76. Again, the segment shown in 3A is designed for the case where the spectrum line is focused upon a radius of reticle 50 with the shorter wavelengths closest to the rotational axis 53; however segment 80 shown in FIG. 3A differs from segment 70 shown in FIG. 3B in that the length of time during which a portion of the spectrum line passes through segment 80 is inversely proportional to the wavelength of that particular portion of the spectrum line. Thus the radiation pulses passing through $1/\lambda$ contoured segment 80 will comprise continuous spectral portions of the spectral line image differentially transmitted for durations proportional to the power of $-1$ of the wavelengths of the continuous portions. When this radiation illuminates detector 56, which has been selected to be a quantum detector, the electrical output signals of detector 56 will be equivalent to a signal that would have been obtained by illuminating an energy detector with unfiltered radiation. Those pulses of radiation which pass through uncontoured pie-shaped transparent segment 72 of reticle wheel 50 will be unfiltered and will generate an electrical signal from detector 56 that is typical of a quantum detector output. As in the previous example, the alternate electrical output signals from detector 56 are amplified, integrated, separated, and ratioed to produce a final electrical output signal at terminal 66 that is proportional to absolute color temperature of source 12.

The reticle patterns illustrated in FIGS. 3B and 3A are typical of those that would be used with an $Al_2O_3$ prism at 46 and with an energy or quantum detector having linear response characteristics. These reticle patterns can be readily contoured to match the dispersion characteristics of prisms made of different materials and to compensate for spectral nonlinearities of detector 56. Going even further, the contours of transparent area 76 may be configured to powers of wavelength, not necessarily integer, other than +1, 0, or −1 that were used in the $\lambda$ contoured segment 70, pie-shaped segment 72, and $1/\lambda$ contoured segment 80, respectively, in the above examples. In this manner, if the transparent area 76 of contoured reticle segment 70 shown in FIG. 3B was contoured to a factor $\lambda^2$ and used in conjunction with an energy detector at 56 and the resulting detector output signal processed as indicated above, the final electrical output signal at terminal 66 would be proportional to the second power of the absolute color temperature of source 12. Using the same combination but with transparent area 76 contoured to higher or lower powers of wavelengths, the final electrical output signal at terminal 66 would then be proportional to corresponding higher or lower powers of the absolute color temperature of source 12.

Of special interest is a reticle wheel 50 having a first set of segments contoured as a function of $\lambda$ as is shown by segment 70 of FIG. 3B, and a second alternating set of segments contoured as a function of $1/\lambda$ as is shown by segment 80 of FIG. 3A. When reticle wheel 50 configured in this manner is used in conjunction with an energy detector at 56 and the ratio of the signals corresponding to segment 80 to those of segment 70 is taken, the electrical output signal at terminal 66 will be proportional to the second power of the absolute color temperature of source 12 and will be a very close match to the best fit energy curve of non-gray body source 12.

Similar results can be obtained by applying various contours to segments 70 and 80 when used in conjunction with a quantum detector at 56. Thus the final electrical output signal at terminal 66 can be tailored to suit the particular characteristics of source 12 or to obtain any desired function of absolute color temperature of source 12.

Other methods of spectral filtering may be employed in the practice of this invention. For example, instead of employing reticle wheel 50 in the embodiment shown in FIG. 2 for spatial spectral filtering the spectrum line image, the spectrum line image may be passed through a rotating or oscillating prism which will cause a scanning action of the spectrum line image over detector 56. If the rotation or oscillation of the prism is then programmed by a cam or other variable motion device, the durations during which continuous spectral portions of the spectrum line image illuminate detector 56 can be made proportional to a selected power of wavelength and can be made to compensate for spectral dispersions or other nonlinearities of the system. Conversely, the spectrum line image may be held stationary and the variable motion device applied to detector 56 to cause it to scan the spectrum line image in a manner providing spectral filtering in accordance with the teachings of this invention.

A further modification of the embodiment shown in FIG. 2 is one in which reticle wheel 50 is retained but with the substitution of variable density pie-shaped filter segments in place of contoured segments 70 and 80 shown in FIGS. 3B and 3A, respectively. If these pie-shaped segments were made with an optical density which varied radially across the segments, appropriate selected spectral filtering factors would be applied to the spectrum line image as it passed through reticle wheel 50. This modification would have the advantage that the alternate output signal pulses from detector 56 could be ratioed at 64, after suitable amplification at 58 if desired, and pulse separation accomplished at 62, without the need for time integration over the pulse width at 60. In this manner, pulse integrator 60 could be eliminated from the embodiment shown in FIG. 2.

In summary, this invention provides a method and apparatus for determining the absolute color temperature of a thermally radiating source whereby a substantial portion of the total spectral range of the emitted radiation is collected and a first electrical signal generated which, in general mathematical terms, is proportional to:

$$\int_{\lambda_1}^{\lambda_2} \lambda^{-m} \epsilon_\lambda (e^{\frac{hc}{\lambda kT}} - 1)^{-1} d\lambda$$

and a second electrical signal generated which is proportional to:

$$\int_{\lambda_1}^{\lambda_2} \lambda^{-n} \epsilon_\lambda (e^{\frac{hc}{\lambda kT}} - 1)^{-1} d\lambda$$

where: $\lambda_1, \lambda_2 =$ the lower and upper wavelengths, respectively, of the collected radiation;

$m =$ a number, not necessarily integer, greater than 2;
$n (\neq m) =$ a number, not necessarily integer, greater than 2;
$\epsilon_\lambda =$ spectral emissivity of the source;

and the other parameters are those defined in connection with the discussion of equation (1) above. These electrical signals may be generated by directing spectrally filtered alternate pulses of the collected radiation to a single time shared radiation detector followed by separately time integrating the alternate detector output pulses; or by directing a first portion of collected radiation to an energy response radiation detector and a second portion to a photon counting response radiation detector. In either case, the first electrical signal is ratioed to the second electrical signal to obtain an electrical output signal proportional to the absolute color temperature of the source raised to the power of $(m-n)$.

It is to be understood that the components shown in FIG. 2 are examplary only to show the versatility of the temperature measurement technique of this invention. While collecting optics 14 shown in that figure is a typical cassagrainian optical system, other reflective or refractive collecting optics could be substituted as long as the selected optics are able to pass the desired spectral range of the radiation emitted by source 12. In like manner, prism 46 could be replaced or modified by a diffraction grating or other optical element capable of spectrally dispersing the collected radiation directed upon it. The purpose of cone channel condenser 50 is to alter the physical dimensions of the image focused upon and passing through reticle 52 so that all of the image will be intercepted by detector 56. Other methods of accomplishing the same results may be used. For example, detector 56 may be physically proportioned to provide total interception. Other possibilities are the substitution of various reflective or refractive optical systems or fiber optics to transmit the focused image to detector 56. Other variations and substitutions will be apparent to those skilled in the art.

What is claimed is:

1. The method of determining the absolute color temperature of a thermally radiating source comprising the steps of:
   a. collecting a solid angle of a substantial portion of the total spectral range of the radiation emitted by the source;
   b. forming a first pulse of the collected radiation and spectrally filtering said first pulse over the spectral bandwidth of the radiation, the factor of said filtering being a function of a first selected power of the instantaneous wavelength;
   c. forming a second pulse of the collected radiation and spectrally filtering said second pulse over the spectral bandwidth of the radiation, the factor of said filtering being a function of a second selected power of the instantaneous wavelength;
   d. deriving first and second electrical signals proportional to the time integrated first and second spectrally filtered pulses respectively; and
   e. ratioing the first electrical signal to the second electrical signal to obtain an electrical output signal proportional to the absolute color temperature of the source.

2. The method of determining the absolute color temperature of a thermally radiation source comprising the steps of:

a. collecting a solid angle of a substantial portion of the total spectral range of the radiation emitted by the source;

b. collimating and spectrally dispersing said collected radiation into a spectrum line image;

c. differentially transmitting continuous spectral portions of said spectrum line image in a first pulse to a radiation detector for durations proportional to a first selected power, $m$, of the wavelengths of the continuous portions to generate a detector first electrical output signal;

d. differentially transmitting continuous spectral portions of said spectrum line image in a second pulse to said radiation detector for durations proportional to a second selected power, $n$, of the wavelengths of the continuous portions to generate a detector second electrical output signal;

e. separately time integrating the detector first and second electrical output signals; and f. ratioing the time integrated detector first electrical output signal to the second electrical output signal to obtain a final electrical output signal proportional to the absolute color temperature of the source raised to the power of $(m-n)$.

3. The method as claimed in claim 2 wherein said detector is one having energy response characteristics; and wherein the first selected power, $m$, of the wavelengths in step (c) is essentially equal to $+1$ and the second selected power, $n$, of the wavelengths in step (d) is essentially equal to $-1$.

4. An apparatus for determining the absolute color temperature of a thermally radiating source comprising:

a. collecting optics for collecting a solid angle of a substantial portion of the total spectral range of the radiation emitted by the source;

b. a spectral filter intercepting the collected radiation for forming a first pulse of the collected radiation and for spectrally filtering the first pulse of the radiation by a factor of a first selected power of the instantaneous wavelength; said spectral filter further forming a second pulse of the collected radiation and spectrally filtering the second pulse of the radiation by a factor of a second selected power of the instantaneous wavelength;

c. an integrating detector receiving the first and second spectrally filtered radiation pulses for generating first and second electrical signals proportional to the time integrated first and second spectrally filtered pulses respectively; and d. a ratiometer responsive to said integrating detector for ratioing the first electrical signal to the second electrical signal to obtain an electrical output signal proportional to the absolute color temperature of the source.

5. An apparatus for determining the absolute color temperature of a thermally radiating source comprising:

a. collecting optics for collecting a solid angle of a substantial portion of the total spectral range of the radiation emitted by the source;

b. an optical collimator intercepting the collected radiation from said collecting optics for collimating the radiation into a parallel beam;

c. dispersing means receiving the collimated parallel beam from said optical collimator for spectrally dispersing the beam into a spectrum line image;

d. a rotating reticle intercepting the spectral line image from the dispersing means for forming first and second pulses of the spectrum line image.

e. a spatial spectral filter carried by said rotating reticle for differentially transmitting continuous spectral portions of the first pulse of the spectrum line image for durations proportional to a first selected power, $m$, of the wavelength of the continuous portions and for differentially transmitting continuous spectral portions of the second pulse of the spectrum line image for durations proportional to a second selected power, $n$, of the wavelength of the continuous portions;

f. a radiation detector receiving the first and second spectrum line pulses transmitted by said spatial spectral filter for generating first and second electrical signals;

g. an electrical signal integrator electrically connected to said detector for separately time integrating the first and second electrical signals; and h. a ratiometer responsive to said integrator for ratioing the time integrated first electrical signal to the time integrated second electrical signal to obtain an electrical output signal proportional to the absolute color temperature of the source raised to the power of $(m-n)$.

6. The apparatus as claimed in claim 5 wherein said radiation detector is one having energy response characteristics and wherein said spatial spectral filter is adapted to differentially transmit continuous spectral portions of the first pulse of the spectrum line image for durations essentially directly proportional to the wavelength of the continuous portions and to differentially transmit continuous spectrum portions of the second pulse of the spectral line image for durations essentially inversely proportional to the wavelength of the continuous portions.

* * * * *